May 5, 1936. C. F. ROSSETTER 2,039,664
DRIVE DEVICE
Filed July 24, 1934
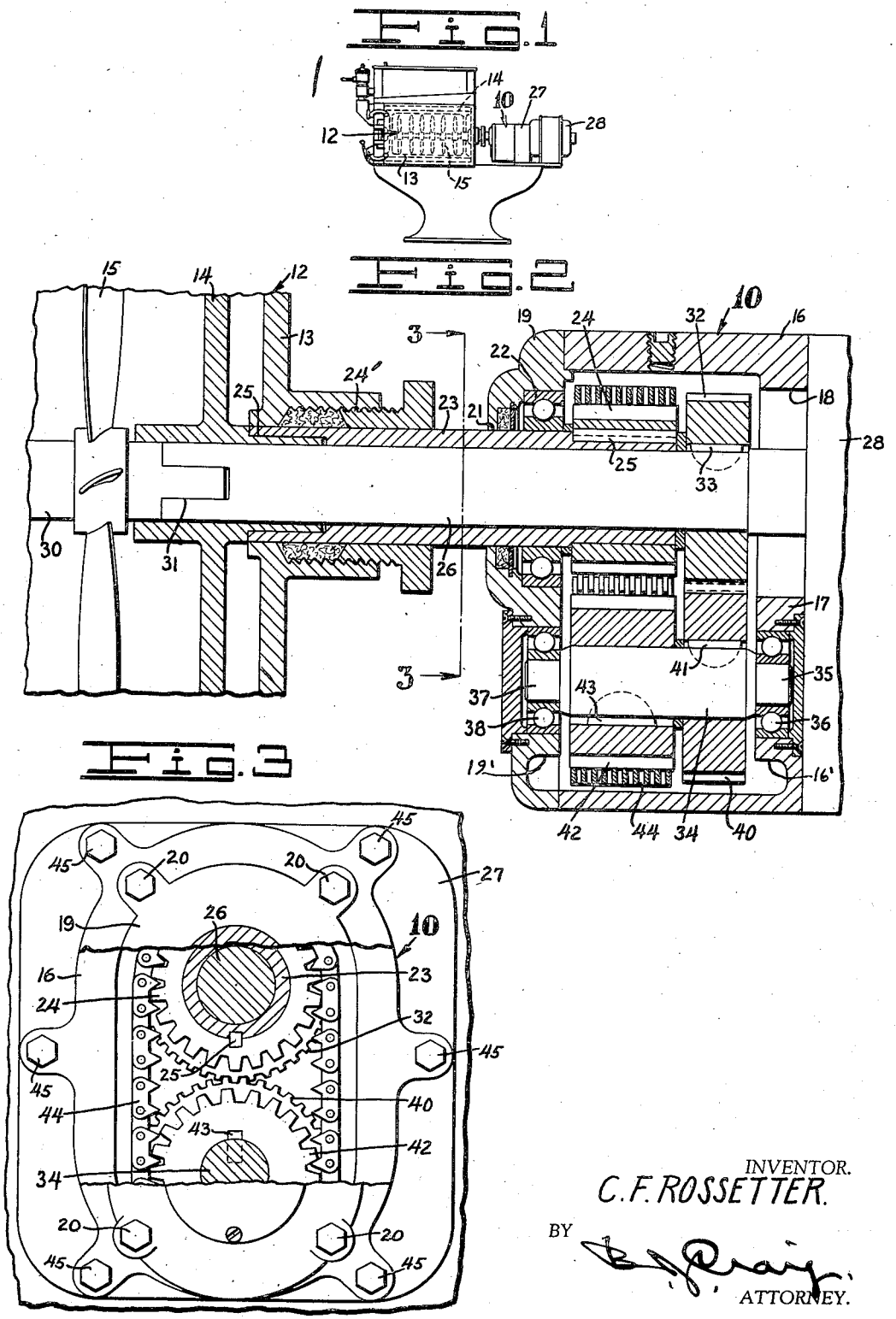
INVENTOR.
C. F. ROSSETTER.
BY
ATTORNEY.

Patented May 5, 1936

2,039,664

UNITED STATES PATENT OFFICE 2,039,664

DRIVE DEVICE

Charles F. Rossetter, Eagle Rock, Calif., assignor to Paul Hawkins, Hollywood, Calif.

Application July 24, 1934, Serial No. 736,670

1 Claim. (Cl. 74—389)

This invention relates to improvements in a drive device.

The general object of the invention is to provide an improved two-way drive device which is particularly adapted to operate ice cream freezers.

Other objects and the advantages of this invention will be apparent from the following description taken in connection with the accompanying drawing wherein:

Fig. 1 is a side elevation of an ice cream freezer embodying the features of my invention;

Fig. 2 is an enlarged central section through my improved drive device and a portion of the freezer; and, Fig. 3 is a section taken on line 3—3 of Fig. 2 with a portion of the drive device broken away.

Referring to the drawing by reference characters I have indicated my improved driving transmission generally at 10, and I have shown it as operatively combined with a standard type of commercial ice cream freezer which is indicated generally at 12. The freezer 12 includes a housing 13 in which the usual scraper device 14 and propeller unit 15 are positioned.

My improved transmission device 10 is shown as including a housing 16 which has an integral wall 17 at one end in which an aperture 18 is provided. The opposite end of the housing 16 is closed by a removable cap member 19 which is secured to the housing by bolts 20. The housing 16 and the cap member 19 each include circular bosses 16' and 19', respectively, in which the bearings 36 and 38 are disposed. The cap 19 includes an aperture 21 which is coaxial with the aperture 18 in the end wall 17 of the housing and mounted in the cap coaxial with the aperture 21 I provide an anti-friction bearing 22. Mounted in the bearing 22 I provide a sleeve 23 which within the housing 16 has a silent chain sprocket 24 mounted thereon and secured thereto by a key 25. The opposite end of the sleeve 23 extends through a packing gland 24' into the freezer housing 13 where it is rotatably secured to the scraper device 14 in the usual manner by a splined connection as indicated at 25'.

Positioned in the sleeve 23 I provide a shaft 26 which in this instance is the drive shaft of a standard speed reduction gear transmission unit 27 which is driven by an electric motor 28.

The sleeve 23 terminates approximately flush with the inner face of the sprocket 24 while the shaft 26 continues through the housing aperture 18 into the speed reduction transmission 28. The end of the shaft 26 opposite the speed reduction transmission 28 extends into the freezer housing 13 beyond the end of the sleeve 23 and is rotatably connected to the shaft 30 of the propeller unit 15 in the usual manner by a key and slot connection as indicated at 31.

Mounted on the shaft 26 intermediate the sprocket 24 and the rear wall 17 of the housing 16 I provide a gear 32 which is shown as secured to the shaft by a key 33. The gear 32 and the sprocket 24 are of such diameter that they may easily be passed through the aperture 18 when the device is assembled and disassembled.

Positioned in the housing 16 at one side of the shaft 26 I provide a jack shaft 34 having adjacent one end a reduced section 35 which is journaled in an anti-friction bearing 36 mounted in the rear wall 17 of the housing 16. Adjacent the opposite end of the shaft 34 a similar reduced portion 37 is provided which is journaled in an anti-friction bearing 38 mounted in the cap 19. The bearings 36 and 38 are held in place by bearing retaining closures 36' and 38', respectively.

Mounted on the shaft 34 adjacent the rear wall of the housing I provide a gear 40 which is secured to the shaft 34 by a key 41 and meshes with the gear 32. Also, mounted on the shaft 34 adjacent the cap 19 I provide a silent chain sprocket 42 which is secured to the shaft 34 by a key 43.

The sprocket 42 and the sprocket 24 are operatively connected by an endless silent chain 44. In the accompanying drawing I have shown the housing 16 as secured to the housing of the speed reduction transmission device 28 by bolts 45. When the motor 28 operates and drives the shaft 26 through the medium of the speed reduction transmission 27 the gear 32 drives the gear 40 which in turn drives the shaft 34 thereby rotating the sprocket 42 which through the medium of the chain 44 drives the sprocket 24 which in turn rotates the sleeve 23 in a direction opposite to the direction of the shaft 26. Thus the shaft 26 rotates the propeller unit 15 in one direction while the sleeve 23 rotates the scraper device 14 in a direction opposite to the direction of rotation of the propeller unit.

From the foregoing description it will be apparent that I have provided a novel two-way drive transmission for ice cream freezing devices and for other purposes which is simple in construction and highly efficient in operation.

Having thus described my invention, I claim:

In a transmission device, a hollow housing having an integral wall at one end, said wall having an aperture therein, a removable cap member closing the other end of said housing, said cap member having an aperture therein coaxial with said first mentioned aperture, an anti-friction bearing in said cap member aperture, a sleeve in said anti-friction bearing, a sprocket keyed to said sleeve, a shaft in said sleeve, said shaft extending through said first mentioned aperture, said sleeve terminating flush with the inner face of said sprocket, a gear keyed to said shaft, said gear and said sprocket having a diameter less than the diameter of said first mentioned aperture, said housing having a spaced pair of aligned apertures therein, closures for said apertures, said closures having skirts thereon extending into their apertures, a pair of anti-friction members mounted in said apertures and engaged by said skirts, a jack shaft engaging said pair of anti-friction members, a gear mounted on said jack shaft and meshing with said first mentioned gear, a sprocket on said jack shaft in alignment with said first mentioned sprocket and an endless chain connecting said sprockets, the lower portion of said housing and the lower portion of said cap member having circular bosses arranged about said aligned apertures, said pair of anti-friction bearings being disposed within said circular bosses.

CHARLES F. ROSSETTER.